June 20, 1939.     H. W. ROMANOFF     2,163,063
MACHINE FOR MAKING CORRUGATED ARTICLES
Filed Aug. 11, 1937     2 Sheets-Sheet 1
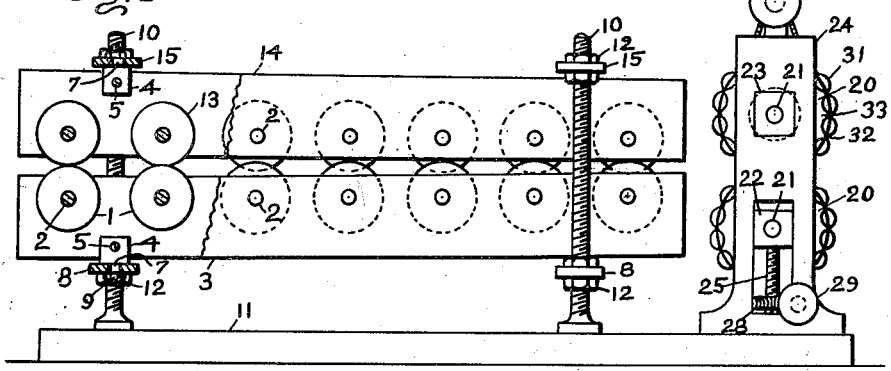
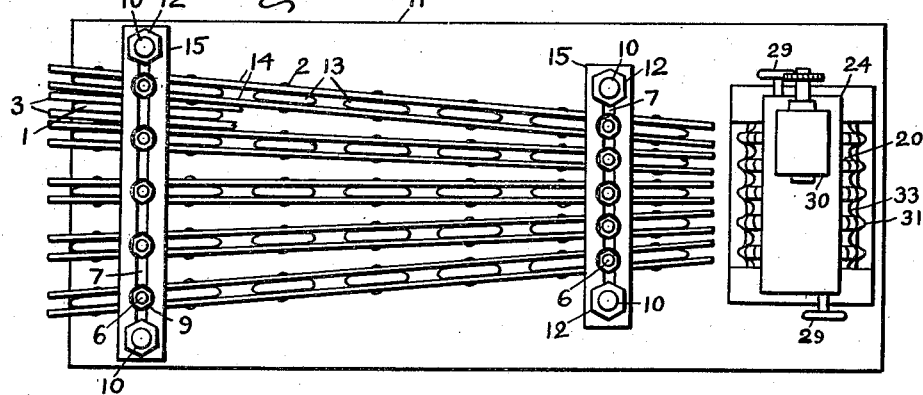
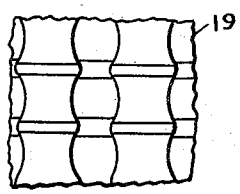
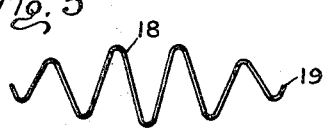
HIPPOLYTE W. ROMANOFF
INVENTOR
BY John P. Mironow
ATTORNEY June 20, 1939.   H. W. ROMANOFF   2,163,063
MACHINE FOR MAKING CORRUGATED ARTICLES
Filed Aug. 11, 1937   2 Sheets-Sheet 2
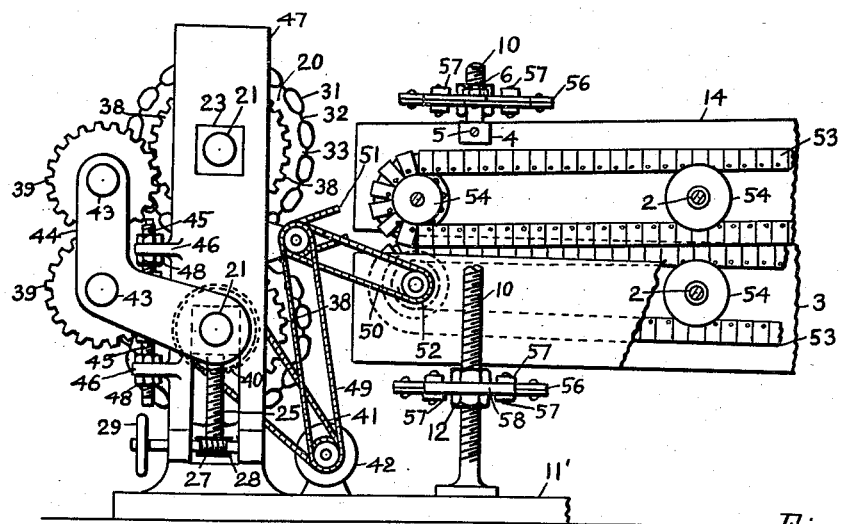
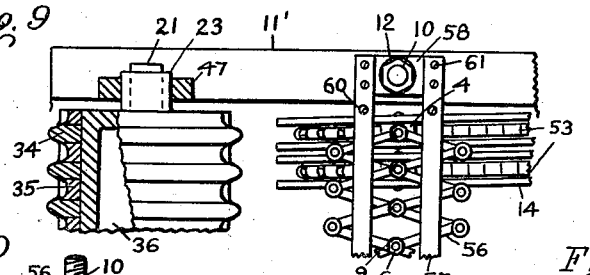
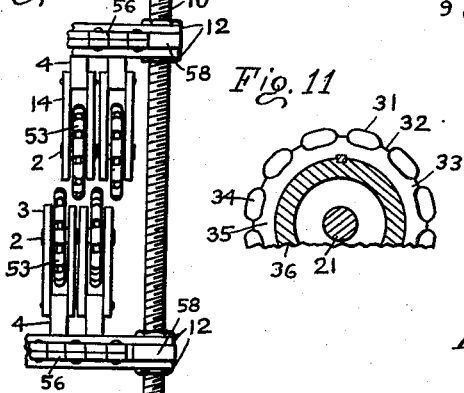
HIPPOLYTE W. ROMANOFF
INVENTOR
BY John P. Nikonow
ATTORNEY Patented June 20, 1939

2,163,063

UNITED STATES PATENT OFFICE 2,163,063

MACHINE FOR MAKING CORRUGATED ARTICLES

Hippolyte W. Romanoff, New York, N. Y.

Application August 11, 1937, Serial No. 158,500

2 Claims. (Cl. 154—30)

My invention relates to machines for making corrugated articles and has particular reference to machines for corrugating sheets of a pliable material.

Ordinary corrugating machines are usually provided with rolls having longitudinal grooves so that sheets of a pliable material, such as paper, iron, etc., are corrugated in a transverse direction, the length of such corrugations being limited by the length of the rolls and width of the sheets. The sheets after such an operation remain more or less flexible and have tendency to curl so that they must be specially straightened out if it is desired to have flat and rigid sheets, as, for instance, are required in erecting building walls of corrugated sheet iron. Rolling lengthwise is not practical in ordinary rolls because of the great contraction in width of the sheets during corrugation, this contraction being resisted by the clamping action of the grooves in the rolls, resulting in the tearing of the sheets.

I have found, however, that it is possible to produce longitudinal corrugations by forming gradually and successively deepening corrugations in the sheet and simultaneously bringing the corrugations closer together so as to take care of the transverse contraction of the sheet being corrugated. This arrangement forms one of the objects of my invention, and it provides means for forming longitudinal corrugations on long sheets of material, the product representing straight and rigid corrugated sheets, which can be used directly in building walls of shops, storehouses, garages, etc., or can be used for fabricating other articles such as corrugated iron pipe, etc.

Another object of my invention is to provide a machine for performing my invention and my method, the machine comprising a plurality of corrugations forming members, such as rollers, etc., rotatively or movably supported on longitudinal bars in such manner that the bars can be adjusted in their relative positions so as to bring the corrugations forming members closer together in vertical and horizontal planes at the delivering end of the machine, thereby controlling the depth of the corrugations and their corresponding spacing. For this purpose I provide horizontal supports for the bars and vertical supports for the horizontal supports, the vertical supports being of a screw type so that the front and rear ends of the horizontal supports can be independently raised or lowered. The horizontal supports are provided with longitudinally spaced corrugations forming rollers on the bars, and the positions of the front and rear ends of the bars can be independently adjusted on the supports in order to regulate the contraction of the corrugations on a sheet of material to be corrugated.

Another object of my invention is to provide special endless chains mounted on grooved rollers, the chains being shaped so as to serve as corrugations forming members. The chains or rollers are spaced in a staggered relation on the upper and lower bars or supports in order to form corrugations in the sheet alternately from its upper and under sides.

Another object of my invention is to provide means to change the shape of the corrugations obtained as described above. For this purpose I provide a pair of rolls with peripheral or other grooves and ridges, the ridges of one roll entering the grooves of the other, the rolls being thereby adapted to receive the corrugated sheet from the delivering or front end of the above described corrugating portion of the machine.

By this means the original corrugations can be more or less modified by the rolls, as, for instance, sharpened, straightened, etc.

Another object of my invention is to provide means on the rolls for transversely deforming the original corrugations on a sheet of material at spaced intervals, thereby producing a special type of corrugations as described in my patent application Serial No. 132,477, filed March 23, 1937. For this purpose I provide the ridges on the rolls with transverse grooves or depressions extending half way into the grooves with correspondingly raised portions in the grooves, these portions being adapted to transversely crush the corrugations at spaced intervals.

In practical embodiments of my invention the rolls may be driven by a separate source of power from the source operating the corrugating rollers or chains, or a single source of power may be provided for operating the rolls, the latter pulling a sheet being processed through the corrugating rollers or chains.

My invention is more fully described in the accompanying specification and drawings in which—

Fig. 1 is an elevational view of my machine.

Fig. 2 is a top plan view of the same.

Fig. 3 is a detail view of a corrugated sheet.

Figs. 4 and 5 are similar views of other forms of corrugations obtainable on my machine.

Fig. 6 is a sectional detail view of a crushed or deformed corrugation obtained on my machine.

Fig. 7 is a top view of the same.

Fig. 8 is a fractional elevational view of a modified machine.

Fig. 9 is a fractional top plan view of the same partly in section.

Fig. 10 is a fractional end view of the same.

Fig. 11 is a fractional detail view of a corrugations deforming roll partly in section.

Figs. 12, 13 and 14 are detail views of a corrugating chain.

Figs. 15 and 16 are sectional views of various forms of corrugations.

My machine for making corrugated articles comprises a plurality of corrugations forming rollers 1 mounted on shafts 2 supported between pairs of flat bars 3. Lugs 4 are held between the two bars of each pair by pins or rivets 5 and are provided with threaded shanks 6 fitting in slots 7 in cross bars 8 being tightened by nuts 9. The cross bars 8 have holes at the ends for vertical screws 10 supported on a base 11. The vertical position of the cross bars 8 is adjusted by nuts 12. The lower bars 3 form with their rollers one set for forming upward extending corrugations in a sheet of a pliable material. Alternately spaced downward extending corrugations are formed by upper rollers 13 supported between upper bars 14 and fastened by lugs 4 to upper cross bars 15. The latter are also held on the upper portions of the screws 10 by the nuts 12. The upper and lower sets of bars 3 and 14 are adjusted on the screws 10 so that the rollers barely make indentations in the sheet at the point of entrance (at the left in Figs. 1 and 2). The rollers then gradually converge as can be seen in Fig. 1 so as to produce grooves or corrugations in either direction to the full depth required at the point of delivery of the finished sheet. The shape of the rollers determines the shape of the corrugations, which may be blunt or sharp pointed.

The sheet may be pulled between the rollers by any suitable agency or by the rollers themselves if they are rotated by a motor or other suitable source of power. My machine is therefore adapted to produce longitudinal corrugations in a sheet of any desired length. The corrugations may be of any conventional shape 16 shown in Fig. 3, but they can also be made of various other shapes which cannot be made by forming them by an ordinary method between rolls with longitudinal grooves. Thus very deep corrugations 17, Fig. 4, can be made, or with periodically varying height 18, Fig. 5.

It should be noted, however, that in forming longitudinal corrugations, the width of the sheet 19 becomes correspondingly contracted, requiring different spacing of the rollers at the beginning and at the end of the corrugations forming operations. The pairs of bars 3 and 14 must be therefore supported so as to converge toward the delivering end of the machine as shown in Fig. 2. The degree of convergence in horizontal plane must correspond to contraction of the width of the sheet, which depends on the depth and shape of the corrugations. The vertical adjustment by the nuts 12 determines the depth of the corrugations while the spacing of the bars determines the shape or angle of the corrugations. The corresponding resulting contraction of the sheet is taken care of by adjusting the degree of convergence of the bars toward the front or delivering end.

The sheet 19 can be pulled through the machine by a pair of rolls 20 mounted on shafts 21 in bearings 22 and 23 fitted in brackets 24. The lower bearings 22 are supported on adjusting screws 25 which can be turned by handwheels 29 through worms 27 and worm gears 28. The clearance between the rolls can be thereby adjusted for any thickness of the sheet 19.

The rolls can be driven by an electric motor 30 or by any other suitable source of power. When they are used for pulling the sheet between the rollers 1 and 13, then for starting the work a strip is attached to the end of the sheet and is fed through the machine by hand until caught by the rolls. The rolls can be used for straightening and calendering the corrugations obtained by the rollers 1 and 13 or for changing or modifying the shape of the corrugations as shown in Figs. 15 and 16. The principal object of these rolls is, however, performance of an additional operation on the corrugated sheet, i. e. formation of supplementary transverse corrugations or grooves across the longitudinal corrugations as shown in Figs. 6 and 7, or preparation of so-called "crushed corrugations". For this purpose the peripheral ridges 31 on the rolls are undercut half way to their height as shown at 32, the grooves between the ridges having correspondingly raised portions 33, the portions 33 meeting the corresponding portions 33 of another roll with the proper allowance for the combined thickness of the sheet in its folded corrugation. The grooves 32 extend longitudinally on the rolls, grooves of one roll registering with the grooves of the other, unlike the arrangement of ordinary corrugating rolls in which grooves of one roll register with the ridges of the other. The effect of the transverse corrugations is that the primary corrugations produced by the rolls 1 and 13 are crushed or jammed together at spaced intervals as shown in Figs. 6 and 7. Such crushed corrugated sheets form an excellent packing material, being flexible in all directions, light and resilient, well protecting the enclosures, as described in my above cited patent application.

The rolls for the corrugations crushing operation can be made by assembling rings 34 and 35 on a drum 36, Figs. 9 and 11.

The rings 34 have projections 31 and transverse grooves or depressions 32, the rings 35 having corresponding raised portions 33 and depressions 37. The spacing of the rings 34 corresponds to the spacing of the rollers 1 and 13 at the front end of the machine.

A modified arrangement for driving the rolls 20 is shown in Fig. 8. Each roll has a gear 38 in mesh with an idler gear 39, the latter gears being in mesh with each other. A sprocket 40 on the lower shaft 21 is connected by a chain 41 with a motor 42. The gears 39 turn on stub shafts 43 mounted in a bracket 44 rotatively fitted on the extension of the shaft 21. The position of the bracket 44 is adjusted by vertical screws 45 in lugs 46 on a frame 47, the screws being held by nuts 48. This arrangement is used for adjusting the gears for any particular setting of the rolls 20.

The motor 42 is also connected by chains 49, 50 and 51 with sprockets 52 on the shafts 2 between the bars 3 and 14 which may carry the corrugating rollers 1 and 13. As shown in Fig. 8, however, the machine in its modified form has corrugating chains 53 supported on rollers 54. The chains are shown in detail in Figs. 12, 13 and 14 and are formed of U-shaped pieces or links having flattened extensions 59 pivoted to the U-shaped portions at 55. The U-shaped portions are formed according to the desired shape of the corrugations. The number of rollers for supporting the chains is considerably smaller than when the rollers themselves are used for making corrugations.

A modified arrangement for supporting the bars 3 and 14 is also shown in Figs. 8, 9 and 10, this arrangement comprising lazy tongs 56 held between bars 57 whose ends are fastened to end blocks 58 with holes for the screws 10 to be held by nuts 12.

The lazy tongs are set for the desired distances between the chains 53 (or rollers 1 and 13 as the case might be) and are clamped in this position by tightening screws or bolts 60 connecting together the bars 57 or tightening screws 61 fastening the bars to the blocks 58.

My machine can be used for corrugating any suitable materials in sheet form such as sheet metal, paper, fiber, Celluloid, etc.

I claim as my invention:

1. A machine for making corrugated articles comprising a plurality of pairs of bars, a plurality of rollers rotatively supported between the bars in every pair, means to support the bars in two planes one above the other, means to adjust the horizontal distances between the pairs of the bars in each plane so as to cause the pairs of bars to converge toward one end, and means to pull a sheet of pliable material between the upper and lower rolls toward the converging ends of the bars so as to form longitudinal corrugations in the sheet, said means to include a pair of rolls with peripheral ribs, the spacing of the ribs corresponding to the spacing of the end rollers, the rolls having longitudinal grooves across the ribs for providing positive engagement with the material for pulling the latter between the rollers and for imparting transverse corrugations to the material.

2. A machine for making corrugated sheet comprising a base, threaded standards on the base, upper and lower cross members slidably supported on the standards, nuts on the standards for adjustably retaining the cross members on the standards, the cross bars having longitudinal slots, a plurality of pairs of bars, studs extending from the bars into the slots in the members, means to tighten the studs against the members, a plurality of rollers rotatively supported between the bars of each pair, the bars being adapted to be adjusted in their positions on the cross members so as to converge toward one end of the base, and means to pull a sheet of pliable material between the rollers toward the converging end, said means including means to form transverse corrugations in the sheet.

HIPPOLYTE W. ROMANOFF.